July 21, 1959
G. K. LE BRUN ET AL
2,895,565
FILTER
Filed Dec. 6, 1956
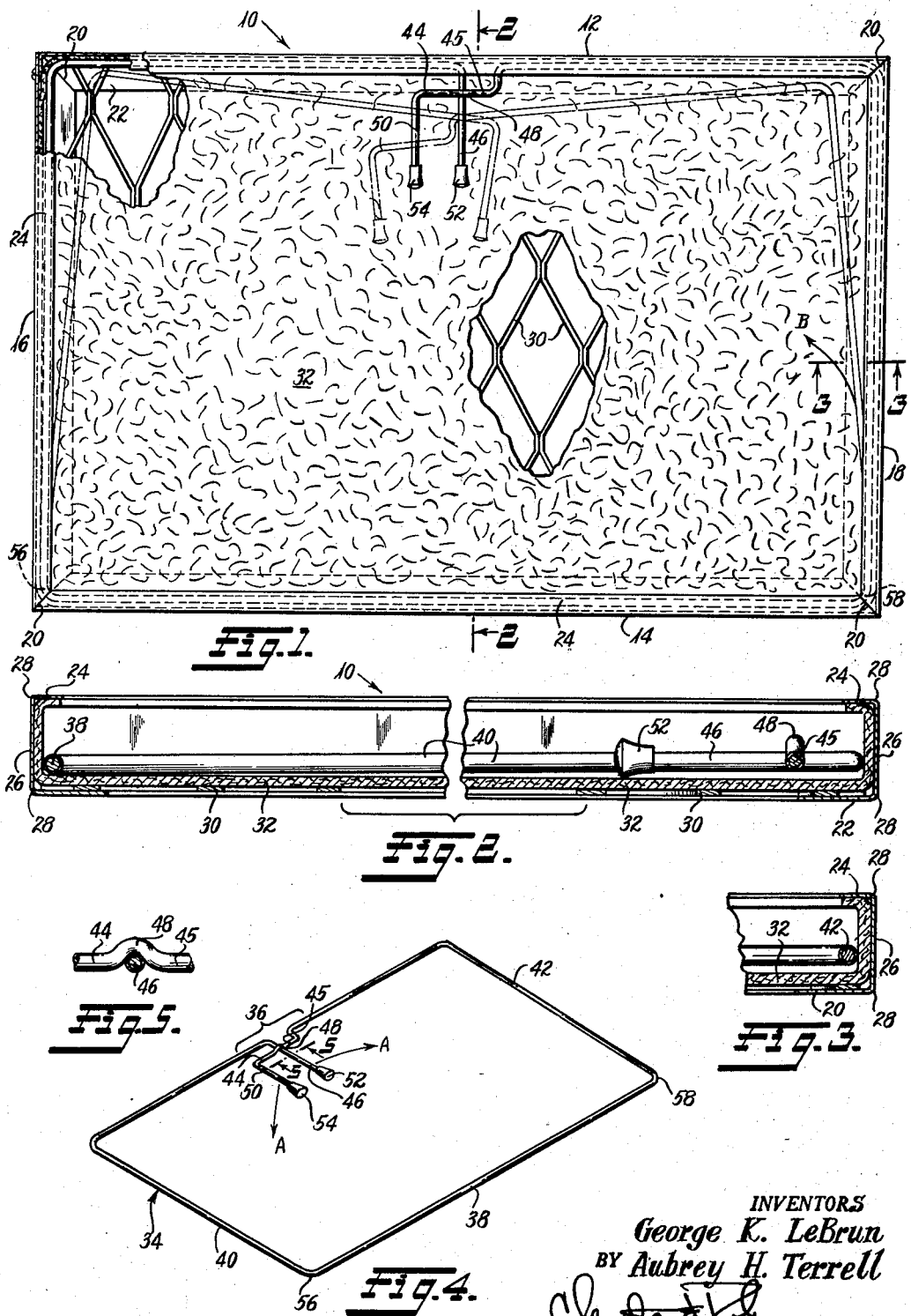
INVENTORS
George K. LeBrun
BY Aubrey H. Terrell
ATTORNEYS

2,895,565
FILTER

George K. Le Brun and Aubrey H. Terrell, Bethesda, Md.

Application December 6, 1956, Serial No. 626,729

1 Claim. (Cl. 183—51)

This invention relates to a filter and more particularly to a removable filter having a readily replaceable filter medium.

Filters presently used in air conditioners, heating systems and the like comprise a frame or support formed as a shallow box and usually rectangular and having at least one filter medium supporting face which is of open mesh or foraminous construction. When such filters become clogged, they are discarded. Discarding the prior art filters entails considerable economic waste, as the frame and the supporting surface for the filter medium are not usually damaged or otherwise rendered useless by clogging of the filter medium.

It is an object of this invention to provide a filter having a disposable and replaceable filter medium.

It is another object of this invention to provide a filter having a durable frame and filter medium supporting means.

It is an additional object of this invention to provide a filter having a rigid frame and a readily exchangeable filter medium.

It is a further object of this invention to provide a filter having a rigid frame and also having manually releasable means for retaining a filter medium in fixed position in the frame.

Another object of this invention is to provide a filter having a rectangular frame, channel shaped in cross-section, and having resilient means releasably holding a filter medium in the frame.

A further object of this invention is to provide a rigid resilient means for retaining a filter medium in its frame.

An additional object of this invention is to provide a resilient means engaging a filter medium to retain same in its frame and having finger engaging means for easily releasing or inserting same.

Yet another object of this invention is to provide a filter medium retaining element of stiff springy material engageable with a filter medium for retaining same in its frame.

A still further object of this invention is to provide a spring retainer having means to lock same in operative position.

The above and other objects will become apparent in the following specification taken with the accompanying drawings forming a part thereof.

In the drawings, wherein like characters of reference indicate like parts in the several figures:

Fig. 1 is a plan view of a filter showing the retaining means in operative position in dotted and full lines and showing the manner of inserting or removing same in dot-dash lines;

Fig. 2 is an enlarged cross-sectional view taken along the line 2—2 of Fig. 1;

Fig. 3 is an enlarged fragmentary view taken substantially on the line 3—3 of Fig. 1;

Fig. 4 is a perspective view of the filter medium retainer, and

Fig. 5 is a fragmentary side view showing the locking arrangement of the filter medium retainer.

Referring now to Fig. 1 of the drawings, wherein there is shown a filter unit 10 comprising channel shaped side members 12, 14, and channel shaped end members 16, 18. The side members 12, 14 and the end members 16, 18 are joined at their respective ends, as at 20, in any suitable manner as by soldering, welding, or they may be integral, to form a shallow rectangular box frame. Each of the side and end members are substantially U-shaped in cross-section and define a channel having a relatively wide bottom flange 22 disposed in a plane which is illustrated in Fig. 2 as being horizontal; a relatively narrow overhanging top flange or lip 24 disposed in a plane substantially parallel to the plane of the flange 22, and an intermediate or bottom member 26. The intermediate or bottom web member 26 constitutes the sides of the shallow box formed by the channel shaped members. The intermediate member 26 is secured along the longitudinal edges thereof, as at 28, to the outer peripheral edges of the flange 22 and 24. On the bottom flange 22 there is placed a rectangular foraminous or open mesh sheet 30 for supporting a filter medium 32 to be hereinafter described.

The channel frame members 12, 14, 16 and 18 are each formed of suitable sheet metal but it is to be understood that they may be formed as channels by extrusion of either metal or plastic, and may be joined as above described or in any suitable well known manner. The filter medium supporting sheet 30 may be formed by a plastic molding process, or it may be formed of metal by the "expanded metal" process. The sheet 30 is attached to the flange 22 by any suitable and appropriate means.

A sheet of filter medium 32 is cut to the appropriate size and configuration to fit the filter unit 10, and rests on the support 30 and engages the channel intermediate web members 26. While any sheet filter material may be used, we prefer to use a cellulose batting or lap type material known commercially as "Allertex." This is a very porous web of loosely agglomerated cellulose fibers such as a card lap of such fibers taken from a carding machine.

A spring retainer 34 formed of a single length of spring wire or rod is bent to form a rectangular frame having sides 36, 38 and ends 40, 42 of a size to fit within the filter unit 10. The ends of the spring, along the side 36, cross or pass over each other intermediate the ends of the side 36. One end is bent inwardly a short distance, as at 45, and then parallel to the side 36, as at 44. The other end is bent inwardly as at 46. The portion 44 has an upwardly arched portion 48 where it crosses the inwardly bent portion 46. The portion 48 is of sufficient size to embrace the portion 46 to lock the ends of the retainer in operative position. The end of the portion 44 is inturned as at 50, and the portions 46 and 50 are provided with knobs or finger pieces 52, 54, respectively.

To assemble the filter, a sheet of filter medium is placed on the support 30 with the marginal edges loosely placed in channel members 12, 14, 16 and 18. The retainer 34 is grasped by the buttons 52, 54 and contracted to the form shown in dot-dash lines in Fig. 1. One corner 56 is placed in the angle between the channel 14 and the channel 16. The side 38 and the corner 58 are forced against the filter medium 32 and into the channels 14 and 18. The side 36 is now pressed against the filter medium 32, whereupon release of the buttons 52, 54 permits the ends 40, 42 and the side 36 to expand into the channels 12, 16 and 18, and presses the marginal edges of the filter medium against the intermediate web portions 26 of the channels.

The retainer 34 rests on the filter medium 32 throughout the major portion of its contour, except for a portion near the knobs 52, 54, which is slightly elevated by engagement of the knobs with the filter medium. A slight pressure on the knobs 52, 54 will cause the portion 48 to snap over the portion 46 whereby the retainer is effectively locked in operative position.

To remove the filter medium for replacement, the knobs 52, 54 are moved apart as shown in dot-dash lines and indicated by the arrows A in Figs. 1 and 4. The corner 58 is then moved in the direction of the arrow B in Fig. 1 and the retainer 34 can then be lifted from the frame and the filter may be removed for replacement in the manner above described.

The retainer is formed, preferably, of round wire or rod and causes no abrasion or tearing of the filter medium in passing thereover. While the retainer 34 is described as being a round wire or rod, it may be formed of plastic or any other material having sufficient resiliency.

It should be apparent that we have devised a filter, which can be sold to users of air conditioners and warm air heaters etc., and which is permanent. In order to renew the filtering ability of the filter, it is necessary only to remove an inexpensive sheet of filtering medium which can be done in a few seconds; and at much less cost than that of replacing conventional filters.

It is to be understood that modifications may be made in the above described invention within the skill of the operator and the scope of the appended claim.

We claim:

In a renewable sheet filter medium supporting structure comprising an inwardly channeled open sided box frame providing spaced marginal top and bottom flanges, a foraminous plate extending across an open side of said frame within the channels and supported on the flanges thereof, a sheet of filter medium supported on said plate and having its marginal portions extending into the channels of said frame, an inner frame member comprising a single length of resilient wire of materially greater length than the channel in said frame engaging the marginal portions of said filter sheet within said channels and having its free end portions extending in overlapping relation against said filter sheet on its supporting plate, and one free end portion of said wire frame being notched inwardly of said channels to resiliently interlock with the other free end portion thereof to retain said filter sheet and plate in fixed relationship within said channelled frame.

References Cited in the file of this patent

UNITED STATES PATENTS

| | | |
|---|---|---|
| 1,037,145 | Houser | Aug. 27, 1912 |
| 1,385,502 | Smith | July 26, 1921 |
| 1,691,967 | Gammeter | Nov. 20, 1928 |
| 1,698,087 | Field | Jan. 8, 1929 |
| 1,854,677 | Umensetter | Apr. 19, 1932 |
| 1,953,786 | Sullivan | Apr. 3, 1934 |
| 2,076,304 | Strindberg | Apr. 6, 1937 |
| 2,692,654 | Pryor | Oct. 26, 1954 |
| 2,754,928 | Hambrecht et al. | July 17, 1956 |